US010845209B2

(12) United States Patent
Rockmore et al.

(10) Patent No.: US 10,845,209 B2
(45) Date of Patent: Nov. 24, 2020

(54) SYSTEM AND METHOD FOR PRESENTING AUTONOMY SWITCHING DIRECTIONS

(71) Applicant: UATC, LLC, San Francisco, CA (US)

(72) Inventors: Logan Rockmore, Pittsburgh, PA (US); Molly Nix, Pittsburgh, PA (US)

(73) Assignee: UATC, LLC, San Francisco, CA (US)

(*) Notice: Subject to any disclaimer, the term of this patent is extended or adjusted under 35 U.S.C. 154(b) by 256 days.

(21) Appl. No.: 15/847,476

(22) Filed: Dec. 19, 2017

(65) Prior Publication Data
US 2019/0186947 A1 Jun. 20, 2019

(51) Int. Cl.
*G01C 21/36* (2006.01)
*B60W 30/00* (2006.01)
*G05D 1/00* (2006.01)

(52) U.S. Cl.
CPC ......... *G01C 21/3697* (2013.01); *B60W 30/00* (2013.01); *G01C 21/3626* (2013.01); *G01C 21/3629* (2013.01); *G01C 21/3667* (2013.01); *G05D 1/0061* (2013.01); *G05D 2201/0213* (2013.01)

(58) Field of Classification Search
CPC ............ G01C 21/3697; G01C 21/3626; G01C 21/3629; G01C 21/3667; B60W 30/00; G05D 2201/0213; G05D 1/0061
See application file for complete search history.

(56) References Cited

U.S. PATENT DOCUMENTS

| | | | |
|---|---|---|---|
| 8,718,861 B1* | 5/2014 | Montemerlo | B60W 30/00 701/26 |
| 8,825,264 B2* | 9/2014 | Montemerlo | G05D 1/0214 701/25 |
| 2013/0297140 A1* | 11/2013 | Montemerlo | G05D 1/0214 701/25 |
| 2014/0156134 A1* | 6/2014 | Cullinane | B60W 50/082 701/23 |
| 2015/0284009 A1* | 10/2015 | Cullinane | G05D 1/0223 701/23 |
| 2018/0003518 A1* | 1/2018 | Hoareau | G01C 21/3484 |
| 2019/0025825 A1* | 1/2019 | Takahama | G08G 1/00 |

* cited by examiner

*Primary Examiner* — Thomas Ingram
(74) *Attorney, Agent, or Firm* — Dority & Manning, P.A.

(57) ABSTRACT

An on-board computing system for a vehicle is configured to generate and selectively present a set of autonomous-switching directions within a navigation user interface for the operator of the vehicle. The autonomous-switching directions can inform the operator regarding changes to the vehicle's mode of autonomous operation. The on-board computing system can generate the set of autonomy-switching directions based on the vehicle's route and other information associated with the route, such as autonomous operation permissions (AOPs) for route segments that comprise the route. The on-board computing device can selectively present the autonomy-switching directions based on locations associated with anticipated changes in autonomous operations determined for the route of the vehicle, the vehicle's location, and the vehicle's speed. In addition, the on-board computing device is further configured to present audio alerts associated with the autonomy-switching directions to the operator of the vehicle.

20 Claims, 5 Drawing Sheets

SYSTEM AND METHOD FOR PRESENTING AUTONOMY SWITCHING DIRECTIONS

BACKGROUND

Through use of ever more sophisticated and robust computer perception, object classification, and prediction techniques, autonomous vehicle (AV) technology is rapidly evolving towards Level 5 autonomy in which no human intervention is required in the driving operations of the AV. However, while AV technology may be rapidly progressing, AV ubiquity on public roads and highways may be on the order of years or a decade or more in the future. In the meantime, certain public roads and highways may be cleared for AV operations while others are not. Certain roads may be ill-suited for AV operations from a technological perspective—the roads may not yet be mapped and sufficiently-tested for AV operations. Other roads may be declared ill-suited for AV operations from a public opinion or legal standpoint—a jurisdiction (e.g., densely populated cities or towns) may declare that AV operations (or a particular level of AV operation) cannot be initiated on all or a portion of its roads. As a result, an AV operating on public roads may be required switch between multiple roads of operation, such as a Level 5 AV operation mode and a manual operation mode.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

An autonomous-capable vehicle (AV or vehicle) can operate in one of a plurality of autonomous modes of operation (also referred to as "self-driving mode(s)"). For example, the vehicle can operate in a manual mode in which vehicle operating controls such as the accelerator, brake, steering, etc. are reserved for a human operator of the vehicle. The vehicle can further operate in a fully autonomous or semi-autonomous mode of operation in which one or more such controls are determined programmatically by a computing system on-board the vehicle based on sensor data, map data, location data, etc.

In certain contexts, various autonomous operation modes of the vehicle can be defined as a plurality of automation levels. For instance, Level 5 operation can refer to full autonomy in which the vehicle is capable of performing all driving functions under all road and weather conditions, whereas in Level 0 operation, the human operator of the vehicle performs all driving tasks. In between Levels 0 and 5, varying degrees of automation can be employed. For example, Level 4 autonomous operation can refer to a high level of automation in which the vehicle is capable of performing all driving functions under certain conditions (e.g., highway driving, optimal weather conditions, etc.). And Level 3 can refer to conditional automation in which the vehicle can perform a multitude of driving tasks, but the human operator must be ready to take control of the vehicle at all times with notice.

Existing autonomous-capable vehicles and their on-board computing systems can enable switching between one or more autonomous operation modes or levels for the vehicle. For example, an operator can initiate a self-driving mode (e.g., Level 3 autonomous operation) while in a manual-operation mode (e.g., Level 0 or Level 1) via an input on a console of the vehicle (e.g., pressing a physical button, selecting a soft feature on a touch-input display, and the like). Likewise, the operator can exit the self-driving mode in a similar manner. In some situations, the vehicle can enter a geographic area that is not mapped for, or is otherwise unsuitable for, autonomous operations by the vehicle. In these situations, the autonomous-operation software executing on existing on-board computing systems of autonomous-capable vehicles can fault and cause the vehicle to enter the manual-operation mode. Furthermore, the vehicle's route can include route segments on which it is not legal for the vehicle to operate in a self-driving mode. In such situations, the operator of the vehicle can be given a short warning (e.g., a few seconds) via a visual signal on the dashboard console and/or via an audible alert. These short warnings are often insufficient to alert the operator of the vehicle to resume control of the vehicle in a smooth and safe manner as the vehicle exits self-driving mode. In other situations, the vehicle may be programmed to automatically enter a self-driving mode for a portion of its journey (e.g., while the vehicle is on a freeway, etc.). Here too, the operator is given a short warning that the vehicle is about to enter a self-driving mode. Again, such a warning is often not sufficient for the operator to smoothly and safely allow the vehicle to transition into the self-driving mode.

Examples described herein provide for an on-board computing system for an autonomous-capable vehicle (AV or "vehicle") that can present a navigation user interface for displaying directions for the operator of the vehicle. The directions presented within the navigation user interface can include navigation directions (e.g., turn-by-turn directions for navigating the vehicle's route) and autonomy-switching directions. The autonomy-switching directions can indicate, to the operator of the vehicle, information regarding adjustments to a mode of autonomous operation of the vehicle. In one variant, the autonomy-switching directions can be presented alongside navigation directions. For instance, the autonomy-switching directions can be presented using the same user interface features or elements within the navigation user interface as the ones used to present the navigation directions. In other variants, the autonomy-switching directions and the navigation directions can be presented using separate user interface features or elements. The autonomy-switching directions can inform the operator, at the appropriate time and/or location, that the vehicle is to transition from a self-driving mode to a manual-operation mode, or vice versa. In addition to or as an alternative, the autonomy-switching directions can inform the operator that the vehicle is to transition from one self-driving mode to another (e.g., from Level 5 autonomous operation to Level 4 autonomous operation). As used herein, autonomy-switching directions can refer to any information, alert, notification, or message presented to the operator of the vehicle informing the operator of an anticipated or impending change in the mode or level of autonomous operation of the vehicle. In addition to information or alerts presented on a visual display of the on-board computing device of the vehicle, autonomy-switching directions can include audible notifications or alerts.

In some examples, the on-board computing system can determine a route for the vehicle based on a start location and a destination location. In some examples, the route of navigation can be determined based further on intermediate location(s) or one or more waypoints. The on-board computing system can do determine the route by utilizing mapping data retrieved from a database accessible to on-board computing system. The database can be an on-board storage storing mapping data on the vehicle or can be a remote mapping data storage communicatively linked to the on-board computing system via one or more network connections (e.g., cellular network, Wi-Fi network, etc.). In a variation, the route can be determined by a network system and route data pertaining to the determined route can be transmitted to the on-board computing system via one or more network connections. For instance, the network system can manage an on-demand transport service within a given geographic region (e.g., San Francisco metropolitan area) and can determine routes for the vehicle to pick up and/or drop off requesting users. The start location and destination location can be entered by a requesting user and can correspond to a pick-up location and a drop-off location for the requesting user, respectively, in association with the request for on-demand transport service. In response to the user's request, the network system can determine the route and transmit the route data to the vehicle and its on-board computing system to enable the vehicle to fulfill the user's request.

According to embodiments, the on-board computing system can generate a set of autonomy-switching directions based on the route data and other information associated with the route of the vehicle. In more detail, the on-board computing system can determine one or more anticipated changes in the mode of autonomous operation of the vehicle along the route and generate the set of autonomy-switching directions based on the one or more anticipated changes in the mode of autonomous operation. The on-board computing device can determine the one or more anticipated changes based on autonomy-operation permissions (AOPs) for each segment of the route of the vehicle. The on-board computing system can partition the route into a plurality of route segments, each of which can represent a corresponding portion of the route. The on-board computing system can access a database to retrieve AOPs for each of the plurality of route segments of the route of navigation. In some examples, an AOP retrieved for a corresponding route segment can indicate whether self-driving is permitted while the vehicle is traversing the route segment. In addition to or as an alternative, the AOP may indicate at which level of autonomous-operation the vehicle is permitted to operate while the vehicle is traversing the route segment. The database for AOPs can be maintained by the on-board computing system or can be accessed by the on-board computing system via the one or more network connections. The AOPs stored in the database can be pre-determined based on various limitations on autonomous vehicle operations such as legal constraints (e.g., laws or regulations allowing or forbidding one or more levels of autonomous operations on a particular route segment), technological constraints (e.g., known technical issues in one or more levels of autonomous operations on a particular route segment), or logistical constraints (e.g., route segment not yet mapped for one or more levels of autonomous operations). Based on differences in AOPs between two adjacent route segments, the on-board computing system can determine an anticipated change in the mode of autonomous operation of the vehicle. Based on the one or more anticipated changes in the mode of autonomous operation determined for the route, the on-board computing system can generate a set of autonomy-switching directions for presentation to the operator of the vehicle.

In certain implementations, the on-board computing system can present the autonomy-switching directions within a navigation user interface, which can be displayed on a screen or display coupled to the on-board computing system. In certain implementations, the on-board computing system can be a tablet computer having a built-in touch screen which can display the navigation user interface. In other implementations, the on-board computing system can comprise a plurality of computing devices—for instance, a tablet computer can be one of these computing devices and operate as the user interface and/or display of the on-board computing system. The autonomy-switching directions can be presented on the navigation user interface along with navigation directions corresponding to the route of the vehicle (e.g., turn-by-turn guidance directions). The autonomy-switching directions can inform the operator of the vehicle that the is to enter a manual operation mode or a self-driving mode. In a variation, autonomy-switching directions informing the operator of a transition from a higher level autonomous operation to a lower level autonomous operation can comprise instructions informing the operator which particular vehicular functions he or she is expected to take over (e.g., steering, acceleration, braking, and other functions). In certain embodiments, the autonomy-switching directions can further include visual elements (e.g., a banner) to inform the operator whether the vehicle is currently operating in autonomous-driving mode or manual-operation mode. Furthermore, the color coding scheme of the navigation user interface (or user interface elements therein) can be based on the current mode of autonomous operation of the vehicle.

According to embodiments, the on-board computing system can selectively display the autonomy-switching directions within the navigation user interface based on: (i) a set of geographical locations associated with the one or more anticipated changes in the mode of autonomous operation of the vehicle, (ii) the current location of the vehicle (e.g., based on location data generated by a location-aware resource of the vehicle), and/or (iii) the vehicle's velocity or rate of travel. In more detail, each of the anticipated changes in the mode of autonomous operation can be associated with a geographical location (e.g., the location at which the autonomous operation of the vehicle is to change). The on-board computing system can display a particular autonomy-switching direction as the vehicle approaches the geographical location associated with the corresponding anticipated change in the mode of autonomous operation. The on-board computing system can further selectively display the particular autonomy-switching direction based on a velocity of the vehicle. For example, based on the velocity of the vehicle as it approaches the geographical location of the anticipated change in the mode of autonomous operation, the on-board computing system can determine when to begin displaying the autonomy-switching direction within the navigation user interface.

In various aspects, the on-board computing system can present audio alerts corresponding to the autonomy-switching directions in addition to displaying the autonomy-switching directions within the navigation user interface. In addition, audio alerts corresponding to navigation directions (e.g., alerts informing the operator to make turns to remain on the route) can also be presented. In some examples, the on-board computing system can selectively present or mute the audio alerts corresponding to the navigation directions based on the current mode of autonomous operation of the vehicle. For instance, while the vehicle is operating in a self-driving mode, the audio alerts corresponding to navigation directions can be muted.

According to one implementation, the vehicle can operate within a given geographic region to provide on-demand transport services for requesting users. In such an implementation, the vehicle can receive, over one or more networks from a network system that manages the on-demand transport services, route data corresponding to a route of navigation for the vehicle. The route data can indicate a start location (e.g., a pick-up location) and a destination location (e.g., a drop-off location). Based on the route data, the on-board computing system can determine portions of the route for which autonomous-driving is to be automatically engaged and portions of the route for which manual-operation is required. For instance, based on retrieving AOPs for route segments of the route from a database, the on-board computing system can also determine certain portions of the route for which manual-operation is required. The on-board computing system can also automatically determine to engage autonomous-driving on portions of the route for which AOPs indicate that autonomous-driving is permitted. Furthermore, the on-board computing system can determine to that manual-operation is required at or near the start location and/or the destination location. Based on such determinations, autonomous-switching directions can be generated and presented to the operator of the vehicle.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Descriptions

Figure 1:
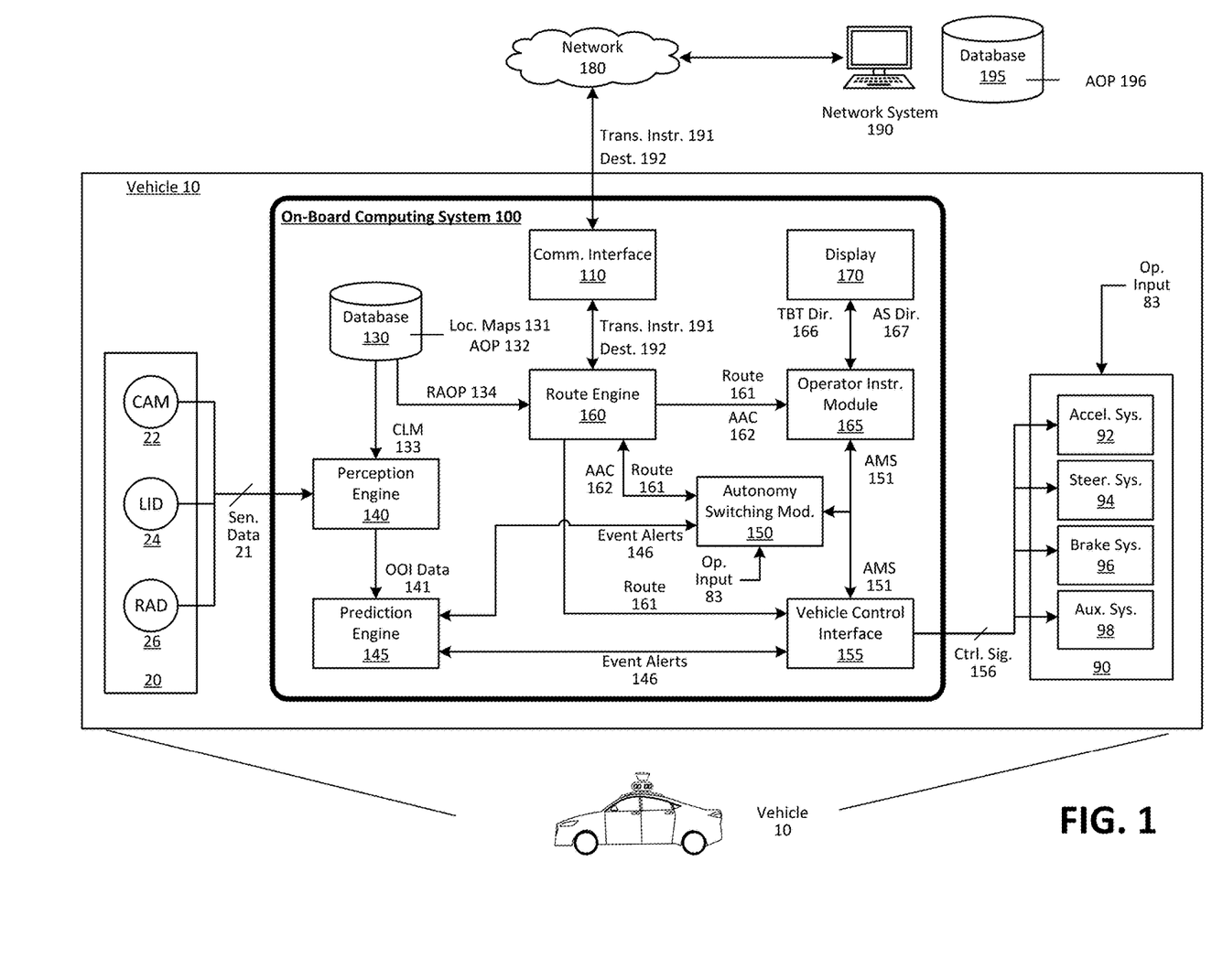
FIG. 1 is a block diagram illustrating an example on-board computing system for a vehicle, in accordance with examples described herein.

FIG. 1 is a block diagram illustrating an example autonomous-capable vehicle (AV or "vehicle") implementing an on-board computing system, as described herein. In an example of FIG. 1, the vehicle 10 can operate in a given geographic region to provide on-demand transportation services for requesting riders. In examples described, the on-board computing system 100 can perform autonomous-driving functions such that vehicle 10 can operate without operator control or with limited operator safety inputs. For example, the vehicle 10 can autonomously steer, accelerate, shift, brake, and operate lighting components. Some variations also recognize that the vehicle 10 can switch between one or more autonomous-driving modes, in which the on-board computing system 100 autonomously operates the vehicle 10, and a manual-operation mode in which a driver takes over manual control of the vehicle operation system 90, including acceleration system 92, steering system 94, braking system 96, and lighting and auxiliary systems 98 (e.g., directional signals and headlights). For example, the vehicle 10 can include an autonomy switching module 150 that can automatically switch the vehicle 10 between the one or more autonomous-driving modes and/or the manual-operation mode. While operating in the one or more autonomous-driving modes, the on-board computing system 100 can utilize specific sensor resources in order to autonomously operate the vehicle 10 in a variety of driving environments and conditions. For example, the on-board computing system 100 can operate the vehicle 10 by autonomously operating the steering, acceleration, and braking systems 92, 94, 96 of the vehicle 10 along a specified route 161. The on-board computing system 100 can perform vehicle control actions (e.g., braking, steering, accelerating) and route planning using sensor information, as well as other inputs (e.g., transmissions from remote or local human operators, network communication from other vehicles, etc.).

According to some examples, the on-board computing system 100 includes computational resources (e.g., processing cores and/or field programmable gate arrays (FPGAs)) which process sensor data 21 received from a sensor suite 20 of the vehicle 10 that provides a sensor view of the environment in which the vehicle 10 operates. The sensor data 21 can be used to determine actions which are to be performed by the vehicle 10 in order for the vehicle 10 to operate autonomously on the route 161 (or a portion thereof) to a destination, or in accordance with a set of transport instructions 191 received from a remote network system 190 that manages routing for a fleet of AVs operating throughout a given region. In some variations, the on-board computing system 100 can include other functionalities, such as wireless communication capabilities using a communication interface 110, to send and/or receive wireless communications over one or more networks 180 with one or more remote sources, including the remote network system 190. In controlling the vehicle 10, the on-board computing system 100 can generate control signals 156 to control the various control mechanisms 90 of the vehicle 10, including the vehicle's acceleration system 92, steering system 94, braking system 96, and auxiliary systems 98 (e.g., lights, directional signals, hazard signals, etc.).

The vehicle 10 can be equipped with multiple types of sensors 20 which can combine to provide a computerized perception, or sensor view, of the space and the physical environment surrounding the vehicle 10. Likewise, the on-board computing system 100 can operate within the vehicle 10 to receive sensor data 21 from the sensor suite 20 and to control the various control mechanisms 90 in order to autonomously operate the vehicle 10. For example, the on-board computing system 100 can analyze the sensor data 21 to generate control signals 156 executable by the acceleration system 92, steering system 94, and braking system 96 of the vehicle 10. Execution of the control signals 156 by the control mechanisms 90 can result in throttle inputs, braking inputs, and steering inputs that collectively cause the vehicle 10 to operate along sequential road segments according to a route 161.

In more detail, the sensor suite 20 operates to collectively obtain a live sensor view for the vehicle 10 (e.g., in a forward operational direction, or providing a 360-degree sensor view), and to further obtain situational information proximate to the vehicle 10, including any potential hazards or obstacles. By way of example, the sensors 20 can include multiple sets of camera systems 101 (video cameras, stereoscopic cameras or depth perception cameras, long range monocular cameras), LIDAR systems 103, one or more radar systems 105, and various other sensor resources such as sonar, proximity sensors, infrared sensors, and the like. According to examples provided herein, the sensors 20 can be arranged or grouped in a sensor system or array (e.g., in a sensor pod mounted to the roof of the vehicle 10) comprising any number of LIDAR, radar, monocular camera, stereoscopic camera, sonar, infrared, or other active or passive sensor systems.

The on-board computing system 100 can communicate with each of the sensors of the sensor suite 20 to receive sensor data 21 via sensor interfaces. The sensor interfaces can be provided on the sensor suite 20 or on the on-board computing system 100. The sensor interfaces can include, for example, hardware and/or other logical components which are coupled or otherwise provided with the respective sensor. For example, the sensors 20 can include a video camera and/or stereoscopic camera system 22 which continually generates image or video data of the physical environment of the vehicle 10. The camera system 22 can provide the image or video data for the on-board computing system 100 via a camera system interface. Likewise, the LIDAR system 24 can provide LIDAR data to the on-board computing system 100 via a LIDAR system interface. Furthermore, as provided herein, radar data from the radar system 26 of the vehicle 10 can be provided to the on-board computing system 100 via a radar system interface. In some examples, the sensor interfaces can include dedicated processing resources, such as provided with field programmable gate arrays (FPGAs) which can, for example, receive and/or preprocess raw image data from the camera sensor.

In various aspects, the sensor system 20 collectively provide sensor data 21 to a perception engine 140 of the on-board computing system 100. The perception engine 140 can access a database 130 comprising stored localization maps 131 of the given region in which the vehicle 10 operates. As provided herein, the localization maps 112 can comprise highly detailed ground truth data of each road segment of the given region. For example, the localization maps 131 can comprise prerecorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the vehicle 10 travels along a given route, the perception engine 140 can access a current localization map 133 of a current road segment to compare the details of the current localization map 133 with the sensor data 21 in order to detect and classify any objects of interest, such as moving vehicles, pedestrians, bicyclists, and the like.

In various examples, the perception engine 140 can dynamically compare the live sensor data 21 from the vehicle's sensor systems 20 to the current localization map 133 as the vehicle 10 travels through a corresponding road segment. The perception engine 140 can flag or otherwise identify any objects of interest in the live sensor data 21 that can indicate a potential hazard. In accordance with many examples, the perception engine 140 can provide object of interest data 141 to a prediction engine 145 of the on-board computing system 100, wherein the objects of interest in the object of interest data 141 indicates each classified object that can comprise a potential hazard (e.g., a pedestrian, bicyclist, unknown objects, other vehicles, etc.). Based on the classification of the objects in the object of interest data 141, the prediction engine 145 can predict a path of each object of interest and determine whether the on-board computing system 100 should respond or react accordingly. For example, the prediction engine 145 can dynamically calculate a collision probability for each object of interest, and generate event alerts 146 if the collision probability exceeds a certain threshold. As described herein, such event alerts 146 can be passed to the vehicle control interface 155. The vehicle control interface 155 can then generate control signals 156 to control various vehicle subsystems 90 of the vehicle 10, such as the vehicle's acceleration, steering, and braking systems 92, 94, 96.

The on-board computing system 100 can include a route engine 160 that can generate a route 161 based on, for example, a start location and a destination location. The route 161 can be generated by the on-board computing system 100 based on map data stored within on-board database 130 or can be generated by the on-board computing system 100 utilizing data stored on remote storage such as database 195. In addition to or as an alternative, the route can be generated by a remote network system (e.g., network system 190) and received by the on-board computing system over network(s) 180. The vehicle control interface 155 can receive the route 161 and generate control signals 156 to maintain the vehicle on the route 161 while the vehicle is in a self-driving mode.

In certain implementations, the route engine can further determine one or more anticipated autonomy changes 162 that indicate anticipated changes in the vehicle's mode of autonomous operations while on the route 161. The route 161 can comprise a plurality of route segments. In some implementations, the route engine 160 can partition a generated or received route 161 into constituent route segments. Each route segment can have a corresponding autonomous operation permission. Such permissions may be pre-determined based on various limitations on autonomous vehicle operations such as legal constraints (e.g., laws or regulations allowing or forbidding one or more levels of autonomous operations on a particular route segment), technological constraints (e.g., known technical issues in one or more levels of autonomous operations on a particular route segment), or logistical constraints (e.g., route segment not yet mapped for one or more levels of autonomous operations). In some implementations, the on-board database 130 can include a set of autonomous operation permissions (AOPs) 132 for the geographic region in which the vehicle 10 such that route AOPs 134 (e.g., AOPs for the route segments that make up route 161) can be quickly retrieved by the route engine 160 to determine one or more anticipated autonomy changes 162 along the route 161. The AOPs 132 stored within the on-board database 130 can be updated as such permissions change over time. For instance, the AOPs 132 can be periodically updated by receiving updated AOPs 196 from a database 195 managed by network system 190.

In the examples described herein, to determine the one or more anticipated autonomy changes 162 along the route 161, the route engine 160 can query on-board database 130 for route AOPs 134 that correspond to the route segments that make up route 161. Alternatively, the route engine 160 can retrieve route AOPs 134 from remote database 195 over network(s) 180 to determine the one or more anticipated autonomy changes 162. For instance, the route engine can determine an anticipated autonomy change 162 based on differences in AOPs between two adjacent route segments. In addition, the route engine 160 can determine the one or more anticipated autonomy changes 162 based on the route 161. For instance, the route engine 160 can determine that at or near the start and/or destination locations of the route 161, the vehicle should be engaged in the manual-driving mode, even if self-driving operations are permitted as indicated by the route AOPs 134. Similarly, the route engine 160 can also determine that manual operations are required at or near locations along the route 161 other than the start or destination locations—such as an intermediate pick-up or drop-off location for a rideshare passenger on the vehicle 10—and determine anticipated autonomy changes 162 based on such a determination.

In certain implementations, the on-board computing system 100 can include an autonomy switching module 150 that can transition the vehicle 10 from a manual-operation mode to one or more self-driving modes and vice versa. The autonomy switching module 150 can change the mode of operation of the vehicle based on operator input 83. For instance, the operator of the vehicle can select to transition the vehicle 10 from operating in a manual-driving mode to a self-driving mode or vice versa. In certain implementations, the autonomy switching module 150 can retrieve relevant AOPs 132 from the on-board database 130 or AOPs 196 from network database 195 to determine if the vehicle is permitted to operate in self-driving mode prior to transitioning the vehicle 10 to self-driving mode operations based on the operator input 83. In addition, the autonomy switching module 150 can transition the vehicle, for example, from operating in the self-driving mode to the manual-driving mode in response to event alerts 146 generated by the prediction engine 145. For instance, an event alert 146 can indicate that a fault has occurred in the self-driving operations has occurred and the vehicle must be switched to manual-driving mode. As another example, the event alert 146 can also indicate that the vehicle is under an unexpected scenario for which the engaged self-driving mode cannot handle (e.g., adverse weather or road conditions, etc.). In response, the autonomy switching module 150 can transition the vehicle 10 to the manual operation mode. Still further, the autonomy switching module 150 can transition the vehicle 10 to the self-driving mode or to the manual-driving mode based on the route 161 and the anticipated autonomy changes 162. For instance, along a route, the vehicle 10 can be scheduled to enter self-driving mode along certain portions (e.g., while on a route segment for which autonomous operations are permitted such as on a freeway or expressway) and exit self-driving mode for other portions (e.g., while on a route segment for which autonomous operations are not permitted, at or near a pick-up or drop-off location, etc.). In these various aspects, the autonomy switching module 150 generates an autonomy mode selection (AMS) signal 151 to the vehicle control interface 155 to transition the vehicle in or out of the self-driving mode.

In the examples described herein, the on-board computing system 100 can further include an operator instruction module 165 that can generate a set of autonomy-switching directions 167 for presentation to the operator of the vehicle. The autonomy-switching directions 167 can indicate information regarding adjustments to the mode of autonomous operation of the vehicle. For instance, the autonomy-switching directions 167 can inform the operator, at the appropriate time and/or location, that the vehicle is to transition from a self-driving mode to a manual-operation mode, or vice versa. The autonomy-switching directions can also inform the operator that the vehicle is to transition from one self-driving mode to another (e.g., from Level 5 autonomous operation to Level 4 autonomous operation). The operator instruction module 165 can further generate turn-by-turn directions 166 for presentation to the operator of the vehicle 10. The turn-by-turn directions 166 can be continually presented to the operator on the navigation user interface to inform the operator of directions to remain on the route 161. In some examples, the autonomy-switching directions 167 can be presented alongside turn-by-turn directions 166. For instance, the autonomy-switching directions 167 can be presented using the same user interface features or elements within the navigation user interface as the ones used to present the turn-by-turn directions 166. In some implementations, the operator instruction module 165 can further generate audio alerts corresponding to the autonomy-switching directions 167 and/or the turn-by-turn directions 166. Furthermore, the on-board computing system 100 can be configured to selectively present the audio alerts corresponding to the turn-by-turn directions 166 based on the current mode of autonomous operation of the vehicle 10 (e.g., as indicated by autonomous mode selection 151). For instance, while the vehicle is operating in a self-driving mode, the on-board computing system 100 can determine to mute the audio alerts corresponding to the turn-by-turn directions 166.

According to embodiments, the on-board computing system can selectively present the autonomy-switching directions 167 based on: (i) a set of geographical locations associated with the one or more anticipated changes in the mode of autonomous operation of the vehicle, (ii) the current location of the vehicle (e.g., based on location data generated by a location-aware resource of the vehicle), and/or (iii) the vehicle's velocity or rate of travel. In more detail, the vehicle 10 can include a geolocation resource (e.g., sensors for GPS, GLONASS, Galileo, BeiDou, etc.) that can determine the vehicle's current location. As the vehicle 10 approaches a location associated with an anticipated change in autonomous operation, the on-board computing system 100 can determine to present an autonomy-switching direction that corresponds to the anticipated change. The presentation can further be dependent upon the vehicle's speed. For instance, if the vehicle 10 is approaching the location associated with the anticipated change at a low rate of speed, the on-board computing system can determine to present the corresponding autonomy-switching direction when the vehicle 10 is within, for example, 300 feet of the location associated with the anticipated change. On the other hand, if the vehicle 10 is approaching the location associated with the anticipated change at a high rate of speed, the on-board computing system can determine to present the corresponding autonomy-switching direction when the vehicle is within, for example, 800 feet of the location associated with the anticipated change.

In some implementations, the vehicle 10 can communicate with a network system 190 that manages a network service (e.g., an on-demand transport service) over a geographic region to fulfill service requests. The vehicle can provide location data (e.g., periodic location pings) to the remote network system 190. Based on the vehicle's 10 location data, the remote network system 190 may select the vehicle 10 to service a particular transport request by transmitting transport instructions 191 to the vehicle 10. The transport instructions 191 can include, among other things, the destination 192 (e.g., a pick-up location and drop-off location), requesting user identifying information, an optimal route plan to the destination, and the like. The destination 192 can be entered via a user application executing on a user device operated by the requesting user. The destination 192 and other information related to the request for service can be transmitted by the user device via the one or more networks to the remote network system 190.

In various examples, when the vehicle 10 is selected to service transport request from a requesting user, the remote network system 190 can transmit the transport instructions 191 to the communication interface 110 over the one or more networks 180. As described herein, transport instructions 191 can provide the route engine 160 with an overall route at least from given pickup location to a drop off location for requesting user. In some aspects, the transport instructions 191 can also provide route data from the vehicle's 10 current location to the pickup location and/or from the drop-off location to a next pick-up location. As provided herein, the utilization of the vehicle 10 for on-demand transportation can comprise the remote network system 190 providing the vehicle 10 with successive transport instructions 191 or destinations 139, which can enable the routing engine 160 to generate corresponding routes 161 utilized by the vehicle control interface 155.

In the example illustrated in FIG. 1, the on-board computing system 100 is configured to operate the vehicle 10 autonomously as well as generate and present autonomy-switching directions on display 170 for the operator of the vehicle 10. In other examples, it is contemplated that autonomous-driving operations can be performed by an on-board system that is separate from the on-board computing system 100. The on-board computing system 100, which can generate and present autonomy-switching directions, can be configured to communicate with the separate on-board system via one or more networks, communication links, or signal lines. Further description of the on-board computing system 100 is provided below with respect to FIG. 2.

Methodology

Figure 2:
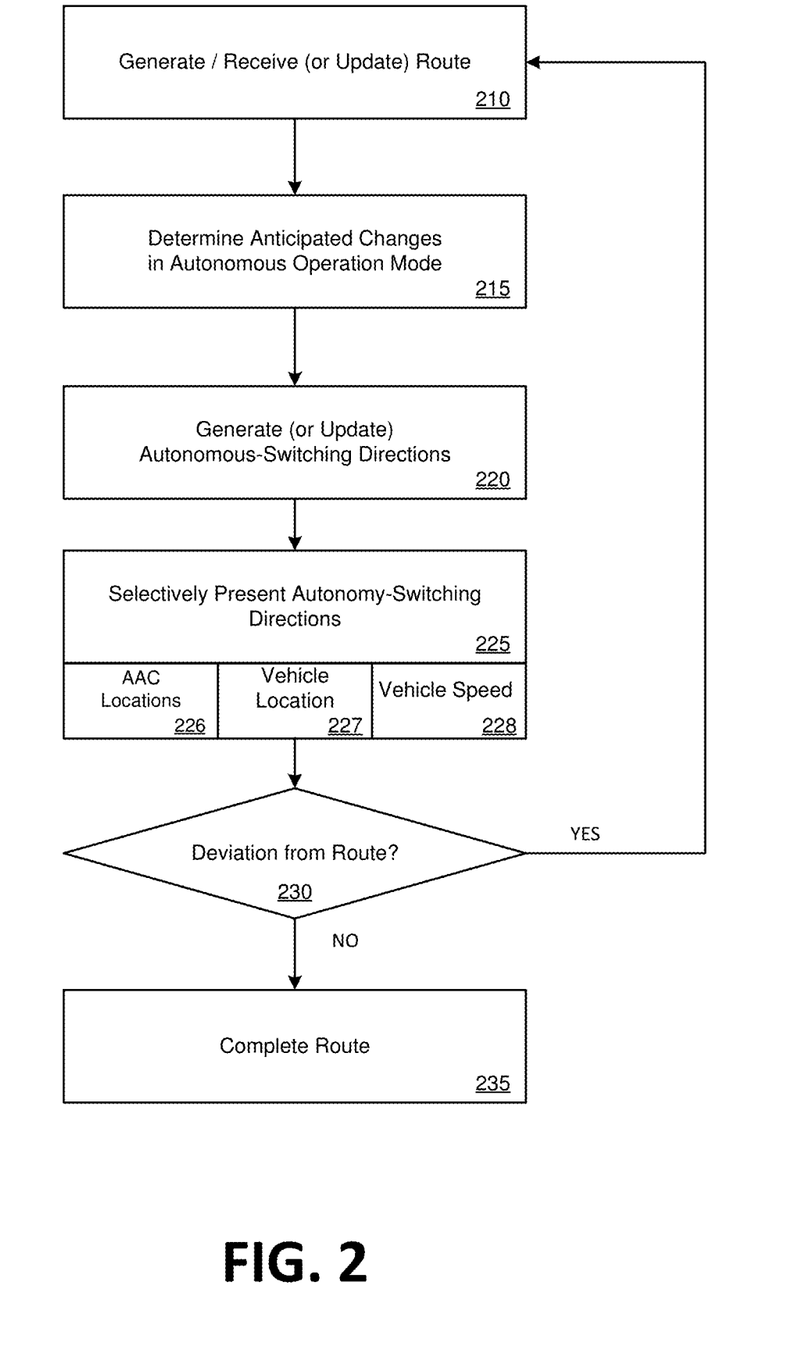
FIG. 2 is a flow chart describing an example method of generating and presenting autonomy-switching directions, according to examples described herein.

FIG. 2 is a flow chart describing an example method of generating and presenting autonomy-switching directions, according to examples described herein. In the below discussion of FIG. 2, reference may be made to features and examples shown and described with respect to FIG. 1. For instance, the example method illustrated in FIG. 2 can be performed by the on-board computing system 100 and/or the vehicle 10 illustrated in FIG. 1.

Referring to FIG. 2, the on-board computing system 100 can generate or receive a route for the vehicle 10 (210). The route for the vehicle can be generated by the on-board computing system 100 based on a start location, a destination location, and/or one or more intermediate route locations. The route for the vehicle can also be generated by a network system and received by the vehicle and/or the on-board computing system via one or more networks (e.g., a cellular network). In certain implementations, the vehicle can provide a service (e.g., an on-demand transport service) over a geographic region managed by a network server. The network server can, in response to a service request received from a user device, select the vehicle to service the request and transmit to the vehicle a route to a start location to rendezvous with the user and/or a route to a service or destination location at which the user is to be dropped-off.

In various aspects, the on-board computing system 100 can determine one or more anticipated changes in the mode of autonomous operations along the route (215). The on-board computing system 100 can do so based on the route and/or other information associated with the route. The on-board computing system 100 can, for example, partition the route into a plurality of route segments and retrieve autonomous operation permissions (AOPs) for the plurality of route segments. The AOPs can be maintained by the on-board computing system within an on-board storage or can be retrieved from a network database. Each of the AOPs can indicate whether self-driving mode is permitted for the vehicle on the vehicle is operating on a corresponding one of the plurality of route segments. The AOPs can be pre-determined based on, for example, legal restrictions, technological limitations, and logistical reasons (e.g., route segment not yet mapped for self-driving). The one or more anticipated changes in the mode of autonomous operation of the vehicle can be determined at least in part on the AOPs retrieved for the plurality of route segments. In addition, the on-board computing system 100 can determine anticipated changes in the mode of autonomous operation based on the route itself. For instance, at or near the start location (e.g., a pick-up location for a user of the network service) and/or the service location (e.g., a drop-off location for the user), the on-board computing system can determine that the vehicle is to operate in the manual-driving mode and can determine anticipated changes in the mode of autonomous operation as a result.

The on-board computing system 100 can generate autonomous-switching directions based on the one or more anticipated changes in the mode of autonomous operations of the vehicle 10 along the route (220). In addition, the on-board computing system 100 can selectively present the autonomous-switching directions within, for example, a navigation user interface (225). The on-board computing system 100 can selectively present the autonomous-switching directions such that the directions are displayed at the appropriate times and/or locations based on the locations associated with the anticipated autonomy changes (226), the vehicle location (e.g., as determined based on location data generated by location-aware sensors on the vehicle 10) (227), and/or the vehicle's speed (228).

While traversing on the route, the on-board computing system 100 can monitor whether the vehicle's position deviates from the route (230). If the vehicle is determined to have deviated from the route, the on-board computing system 100 can update the route (210), determine updated anticipated changes in autonomous operations on the updated route (220), update the autonomous-switching directions (225), and present the updated autonomous-switching directions to the operator of the vehicle 10. At 235, the vehicle 10 arrives at the destination location of the route and completes the route.

User Interface

Figure 3A:
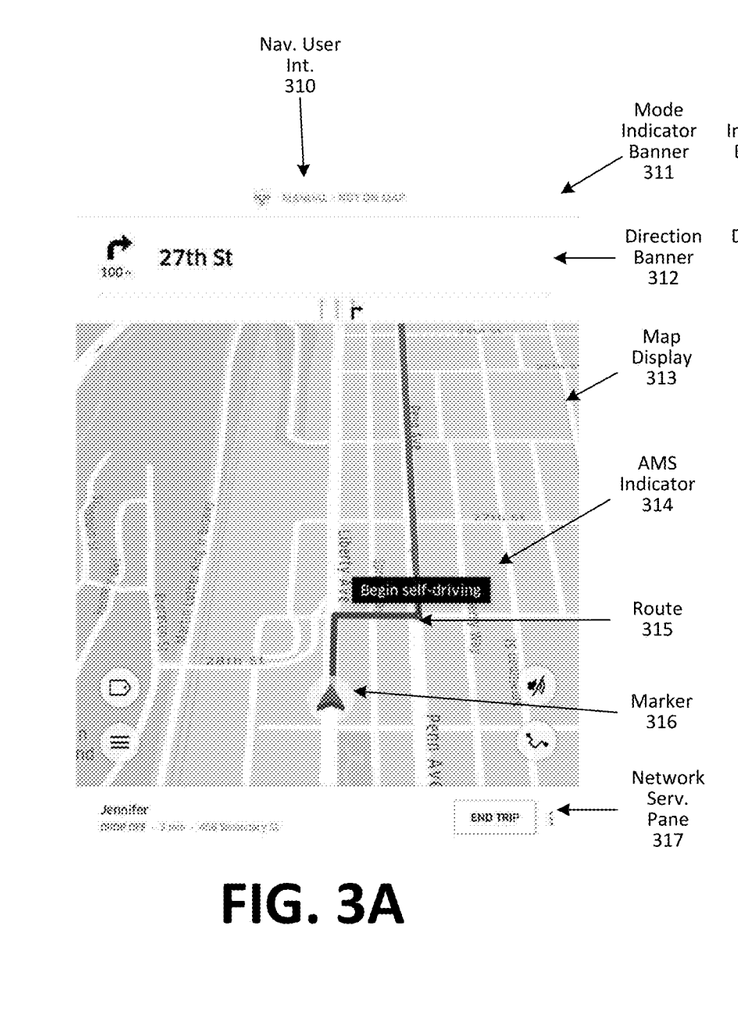
FIGS. 3A-3C are figures illustrating example navigation user interfaces for displaying example autonomy-switching directions, according to examples described herein.
Figure 3B:
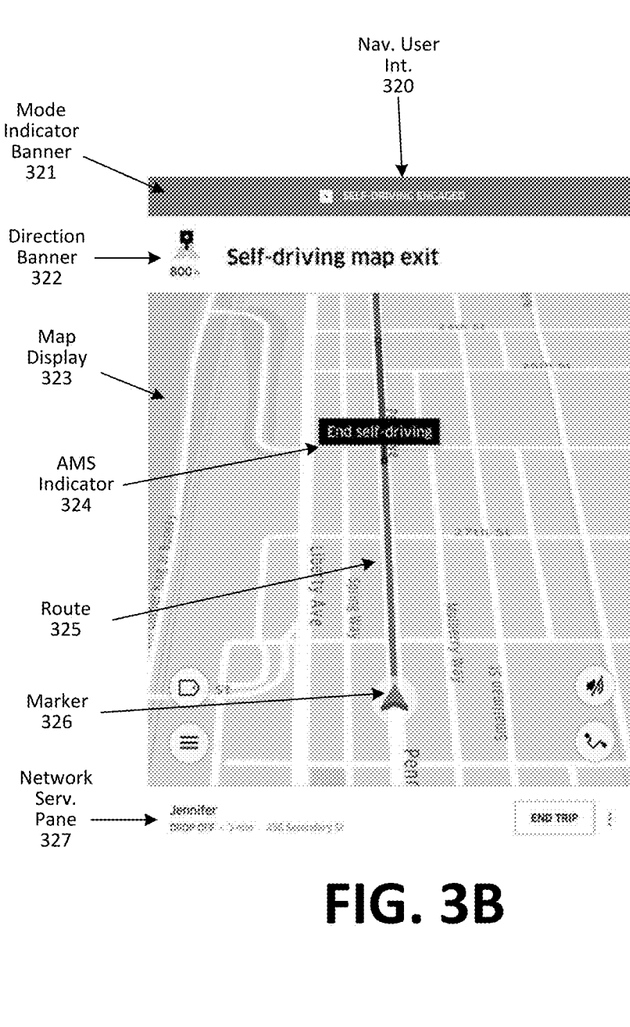
Figure 3C:
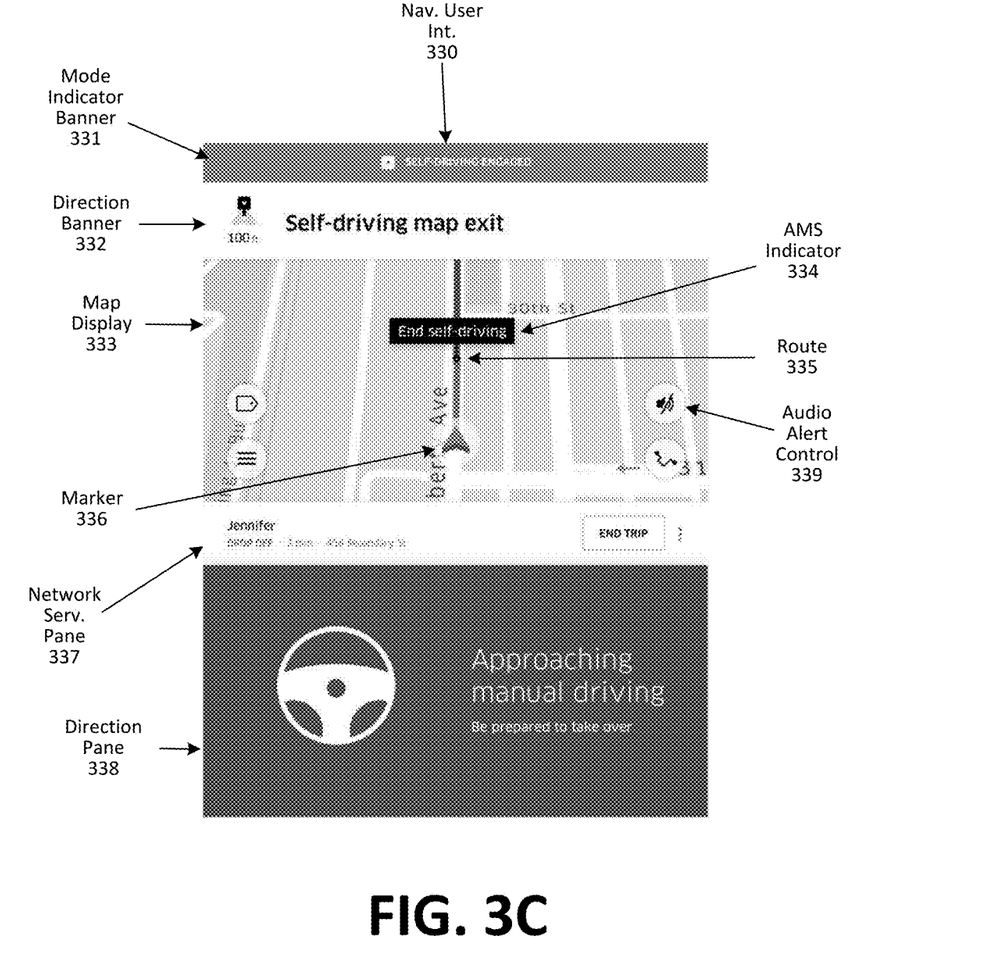

FIGS. 3A-3C are figures illustrating example navigation user interfaces for displaying example autonomy-switching directions, according to examples described herein. In the below discussion of FIG. 2, reference may be made to features and examples shown and described with respect to FIG. 1. For instance, the example method illustrated in FIG. 2 can be performed by the on-board computing system 100 and/or the vehicle 10 illustrated in FIG. 1.

Referring to FIG. 3A, navigation user interface 310 can be presented on a display of the on-board computing system 100 or on a display of the vehicle 10. The interface 310 includes a mode indicator banner 311 that indicates the current mode of autonomous operation of the vehicle 10. The mode indicator banner 311 can be color-coded based on the current mode of autonomous operation of the vehicle 10 and can further display textual information regarding the current mode of autonomous operation of the vehicle 10. As illustrated in FIG. 3A, the mode indicator banner 311 indicates that the vehicle 10 is currently operating in the manual-driving mode. Thus, mode indicator banner 311 includes textual information (e.g., "MANUAL") that so indicates and is color-coded (e.g., white) accordingly. In addition, the mode indicator banner 311 can include additional text information informing the operator of the reason the vehicle 10 is operating in the manual-driving mode. As illustrated, the mode indicator banner 311 can indicate that the vehicle is in a region not mapped for autonomous operations (e.g., "NOT ON MAP").

The navigation user interface 310 can further include a direction banner 312 which can selectively present turn-by-turn directions for the route of the vehicle 10 or for autonomy-switching directions, depending on the situation. For instance, in response to determining that the vehicle 10 is approaching a turn along the route, the on-board computing system 100 can determine to present, within the direction banner 312, turn-by-turn directions corresponding to the turn along the route. In contrast, in response to determining that the vehicle 10 is approaching a location associated with an anticipated change in autonomous operation, the on-board computing system 100 can determine to display the autonomy-switching direction corresponding to the anticipated change in autonomous operation within the direction banner 312. In some situations, the on-board computing system 100 can determine to display both an autonomy-switching direction and a turn-by-turn direction within the direction banner 312.

As illustrated, the navigation user interface 310 can further include a map display 313 which displays a map rendering of an area around the vehicle's current location. The map display 313 can include an autonomous mode switch indicator 314 that marks the location of an anticipated change in autonomous operation, along with textual description of the anticipated change (e.g., "Begin self driving"). The map display 313 can further include a rendering of the route 315 of the vehicle 10. The route 315 can be color-coded such that portions of the route 315 for which the vehicle is anticipated to operate in a self-driving mode can be rendered in one color while portions of the route 315 for which the vehicle is anticipated to operate in manual-driving mode can be rendered in a second color. The map display 313 can further include a marker 316 that illustrates the vehicle's 10 current location and heading.

The navigation user interface 310 can further include a network service pane 317 that depicts information corresponding to a service provided by the vehicle 10. The service can be an on-demand transport service managed by a network server. The network service pane 317 can depict information such as the name of the customer being serviced, the next step in the provision of the requested service (e.g., "DROP OFF"), an estimated time of arrival at the pick-up and/or drop-off location, and an address of the pick-up and/or drop-off location. The network service pane can further include a user interface feature to terminate the service being rendered.

Referring to FIG. 3B, navigation user interface 320 includes the same features as the navigation user interface feature 310 illustrated in FIG. 3A. The navigation user interface 320 illustrates the interface being presented to the operator of the vehicle 10 as the vehicle progresses further along the route illustrated in FIG. 3A. Like the navigation user interface feature 310, the navigation user interface feature 320 includes a mode indicator banner 321, a direction banner 322, a map display 323, and a network service pane 327. As illustrated in FIG. 3B, the mode indicator banner 321 indicates that the vehicle 10 is currently operating in the self-driving mode. The mode indicator banner 321 includes textual information that so indicates (e.g., "SELF-DRIVING ENGAGED") and is also color-coded accordingly (e.g., in green). The direction banner 322 selectively presents an autonomy-switching direction (e.g., "Self-driving map exit") regarding an upcoming anticipated change in the mode of autonomous operations. The direction banner 322 further includes an indication of the distance to the location associated with the upcoming anticipated change in the mode of autonomous operations (e.g., "800 ft"). The map display 313 includes an autonomy mode switch indicator 324 that also corresponds to the upcoming anticipated change in the mode of autonomous operations. The map display 313 further includes a rendering of the route 325 and a marker 326 that indicates the vehicle's 10 current location and heading.

Referring to FIG. 3C, as the vehicle 10 approaches closer to the location associated with the anticipated change in the mode of autonomous operations, the navigation user interface 330 can be pivoted to display an additional feature—a direction pane 338 to present additional information regarding the autonomy-switching directions. For instance, as illustrated, the direction pane 338 informs the operator of the vehicle 10 that the vehicle 10 is approaching manual driving and that the operator should be prepared to take over control of the vehicle 10. The direction pane 338 can be selectively presented within the navigation user interface 330 based on the proximity of the vehicle 10 to the location of the anticipated change in autonomous operations. As the vehicle 10 approaches the location, the map display 333 can be shrunken such that the direction pane 338 can be displayed. Furthermore, like the navigation user interface 310 and 320 of FIGS. 3A and 3B, respectively, the navigation user interface 330 also includes a mode indicator banner 331, a direction banner 332, a map display 333, an autonomy mode switching indicator 334, a rendered route 335, a marker 336 of the vehicle's 10 current location, and a network service pane 337. Furthermore, the navigation user interface 330 can further include an audio alert control 339 that can control whether the audio alerts corresponding to the turn-by-turn directions and/or the autonomy-switching directions are muted.

Hardware Diagram

Figure 4:
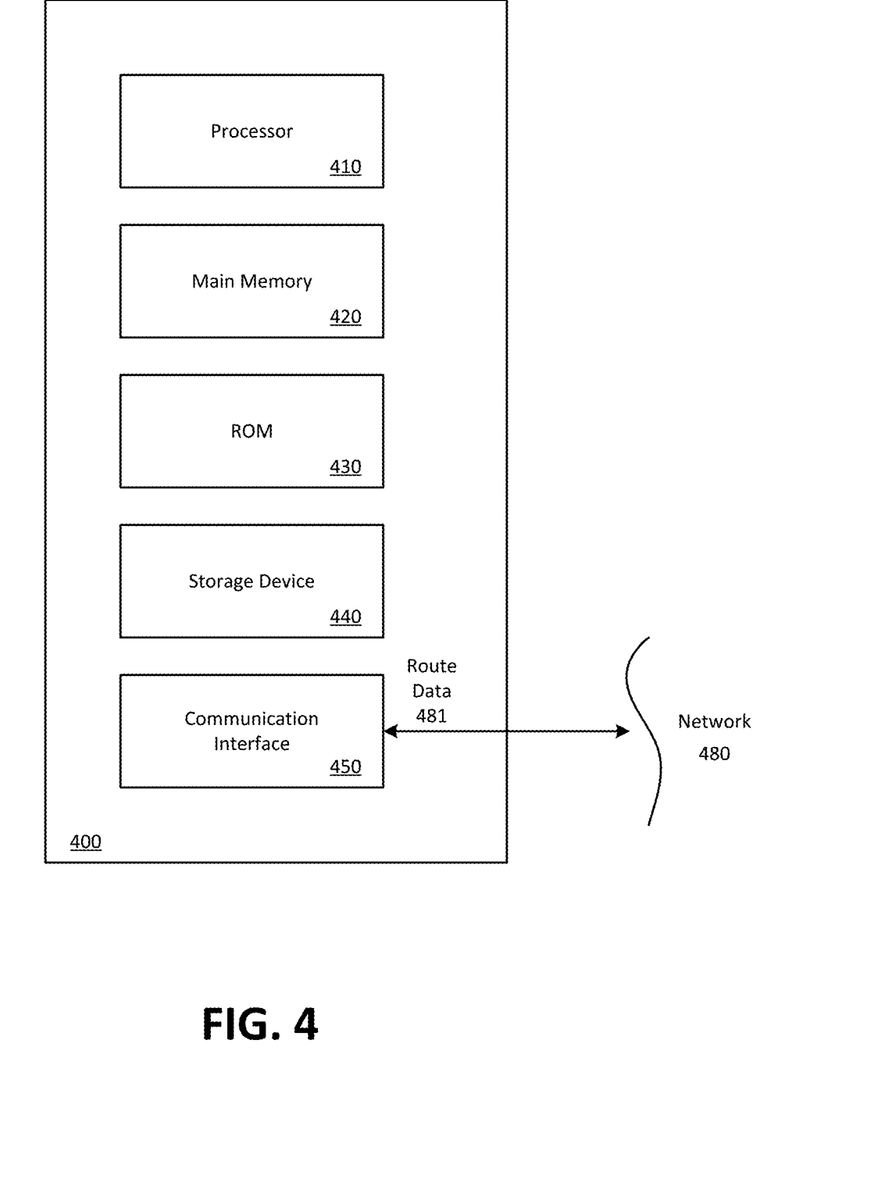
FIG. 4 is a block diagram illustrating a computer system upon which examples described herein may be implemented.

FIG. 4 is a block diagram that illustrates a computer system upon which examples described herein may be implemented. A computer system 400 can be implemented on, for example, a server or combination of servers. For example, the computer system 400 may be implemented as part of an on-board computing system, such as described in FIGS. 1 through 3. In the context of FIG. 1, the on-board computing system 100 may be implemented using a computer system 400 such as described by FIG. 4. The on-board computing system 100 may also be implemented using a combination of multiple computer systems as described in connection with FIG. 4.

In one implementation, the computer system 400 includes processing resources 410, a main memory 420, a read-only memory (ROM) 430, a storage device 440, and a communication interface 450. The computer system 400 includes at least one processor 410 for processing information stored in the main memory 420, such as provided by a random access memory (RAM) or other dynamic storage device, for storing information and instructions which are executable by the processor 410. The main memory 420 also may be used for storing temporary variables or other intermediate information during execution of instructions to be executed by the processor 410. The computer system 400 may also include the ROM 430 or other static storage device for storing static information and instructions for the processor 410. A storage device 440, such as a magnetic disk or optical disk, is provided for storing information and instructions.

The communication interface 450 enables the computer system 400 to communicate with one or more networks 480 (e.g., cellular network) through use of the network link (wireless or wired). Using the network link, the computer system 400 can communicate with one or more computing devices, one or more servers, one or more databases, and/or one or more self-driving vehicles. In accordance with examples, the computer system 400 can receive route data 481 over the network 480 from a network system (e.g., network system 190 of FIG. 1).

The executable instructions stored in the memory 420 can also include content generation instructions 424, which enable the computer system 400 to access user profiles 424 and other user information in order to select and/or generate user content 454 for display on the user devices. By way of example, the instructions and data stored in the memory 420 can be executed by the processor 410 to implement an example network system 190 of FIG. 1. In performing the operations, the processor 410 can receive requests 482 and service provider locations 484, and submit invitation messages 452 to facilitate the servicing of the requests 482. The processor 410 is configured with software and/or other logic to perform one or more processes, steps and other functions described with implementations, such as described by FIGS. 1 to 4, and elsewhere in the present application.

Examples described herein are related to the use of the computer system 400 for implementing the techniques described herein. According to one example, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An on-board computing system for a vehicle comprising:
 a display;
 one or more processors; and
 one or more memory resources storing instructions that, when executed by the one or more processors of the on-board computing system, cause the on-board computing system to:
 receive, over a communication interface, route data corresponding to a route for the vehicle;
 determine, based on the route data, one or more anticipated changes in a mode of autonomous operation of the vehicle along the route for the vehicle, the one or more anticipated changes in the mode of autonomous operation of the vehicle being associated with a set of geographical locations;
 generate a set of autonomy-switching directions based on the one or more anticipated changes in the mode of autonomous operation of the vehicle;
 present, on the display of the on-board computing system, a navigation user interface for displaying a plurality of directions for an operator of the vehicle, wherein presenting the navigation user interface includes selectively displaying autonomy-switching directions based on the set of geographical locations associated with the one or more anticipated changes in the mode of autonomous operation of the vehicle, real-time location data generated by a geo-location resource of the vehicle, and a velocity of the vehicle, wherein the navigation user interface includes a first indicator identifying a start location of an anticipated change in the mode of autonomous operation of the vehicle and a second indicator identifying an end location of an anticipated change in the mode of autonomous operation of the vehicle along the route of the vehicle.

2. The on-board computing system of claim 1, wherein determining the one or more anticipated changes in the mode of autonomous operation of the vehicle along the route comprises determining, using the route data, a plurality of route segments that comprise the route.

3. The on-board computing system of claim 2, wherein determining the one or more anticipated changes in the mode of autonomous operation of the vehicle along the route further comprises retrieving, from a database accessible to the on-board computing system, respective attributes for each of the plurality of route segments indicating an autonomous-operation permission while the vehicle is positioned on the corresponding route segment.

4. The on-board computing system of claim 3, wherein determining the one or more anticipated changes in the mode of autonomous operation of the vehicle along the route further comprises determining, based on the respective attributes for each of the plurality of route segments, the one or more anticipated changes in the mode of autonomous operation of the vehicle along the route.

5. The on-board computing system of claim 1, wherein the vehicle's mode of autonomous operation is one of: (i) a self-driving mode, or (ii) a manual-driving mode.

6. The on-board computing system of claim 1, wherein presenting the navigation user interface further includes displaying turn-by-turn directions corresponding to the route within the navigation user interface.

7. The on-board computing system of claim 6, wherein the navigation user interface includes a feature for presenting both the autonomy-switching directions and the turn-by-turn directions.

8. The on-board computing system of claim 7, wherein the executed instructions further cause the on-board computing system to present audio alerts corresponding to the turn-by-turn directions and audio alerts corresponding to the autonomy-switching directions.

9. The on-board computing system of claim 8, wherein the executed instructions further cause the on-board computing system to selectively present the audio alerts corresponding to the turn-by-turn directions based on the vehicle's mode of autonomous operation.

10. The on-board computing system of claim 9, wherein selectively presenting audio alerts corresponding to the turn-by-turn directions based on the vehicle's mode of autonomous operation comprises presenting the audio alerts corresponding to the turn-by-turn directions in response to determining that the vehicle is operating in a manual-driving mode.

11. The on-board computing system of claim 9, wherein selectively presenting audio alerts corresponding to the turn-by-turn directions based on the vehicle's mode of autonomous operation comprises muting the audio alerts corresponding to the turn-by-turn directions in response to determining that the vehicle is operating in a self-driving mode.

12. A computer-implemented method of managing autonomous operations of a vehicle, the computer-implemented method being performed by an on-board computing system of the vehicle and comprising:
receiving, over a communication interface, route data corresponding to a route for the vehicle;
determining, based on the route data, one or more anticipated changes in a mode of autonomous operation of the vehicle along the route for the vehicle, the one or more anticipated changes in the mode of autonomous operation of the vehicle being associated with a set of geographical locations;
generating a set of autonomy-switching directions based on the one or more anticipated changes in the mode of autonomous operation of the vehicle;
presenting, on a display of the on-board computing system, a navigation user interface for displaying a plurality of directions for an operator of the vehicle, wherein presenting the navigation user interface includes selectively displaying autonomy-switching directions based on the set of geographical locations associated with the one or more anticipated changes in the mode of autonomous operation of the vehicle, real-time location data generated by a geo-location resource of the vehicle, and a velocity of the vehicle, wherein the navigation user interface includes a first indicator identifying a start location of an anticipated change in the mode of autonomous operation of the vehicle and a second indicator identifying an end location of the anticipated change in the mode of autonomous operation of the vehicle along the route of the vehicle.

13. The computer-implemented method of claim 12, wherein determining the one or more anticipated changes in the mode of autonomous operation of the vehicle along the route comprises:
determining, using the route data, a plurality of route segments that comprise the route;
retrieving, from a database accessible to the on-board computing system, respective attributes for each of the plurality of route segments indicating an autonomous-operation permission while the vehicle is positioned on the corresponding route segment; and
determining, based on the respective attributes for each of the plurality of route segments, the one or more anticipated changes in the mode of autonomous operation of the vehicle along the route.

14. The computer-implemented method of claim 12, wherein presenting the navigation user interface further includes displaying turn-by-turn directions corresponding to the route within the navigation user interface.

15. The computer-implemented method of claim 14, further comprising presenting audio alerts corresponding to the turn-by-turn directions and audio alerts corresponding to the autonomy-switching directions.

16. The computer-implemented method of claim 14, wherein presenting audio alerts corresponding to the turn-by-turn directions and audio alerts corresponding to the autonomy-switching directions comprises:
presenting the audio alerts corresponding to the turn-by-turn directions in response to determining that the vehicle is operating in a manual-driving mode; and
muting the audio alerts corresponding to the turn-by-turn directions in response to determining that the vehicle is operating in a self-driving mode.

17. A non-transitory computer-readable medium storing instructions that, when executed by one or more processors of an on-board computing system of a vehicle, cause the on-board computing system to:

receive, over a communication interface, route data corresponding to a route for the vehicle;

determine, based on the route data, one or more anticipated changes in a mode of autonomous operation of the vehicle along the route for the vehicle, the one or more anticipated changes in the mode of autonomous operation of the vehicle being associated with a set of geographical locations;

generate a set of autonomy-switching directions based on the one or more anticipated changes in the mode of autonomous operation of the vehicle;

present, on a display of the on-board computing system, a navigation user interface for displaying a plurality of directions for an operator of the vehicle, wherein presenting the navigation user interface includes selectively displaying autonomy-switching directions based on the set of geographical locations associated with the one or more anticipated changes in the mode of autonomous operation of the vehicle, real-time location data generated by a geo-location resource of the vehicle, and a velocity of the vehicle, wherein the navigation user interface includes a first indicator identifying a start location of an anticipated change in the mode of autonomous operation of the vehicle and a second indicator identifying an end location of the anticipated change in the mode of autonomous operation of the vehicle along the route of the vehicle.

18. The non-transitory computer-readable medium of claim 17, wherein determining the one or more anticipated changes in the mode of autonomous operation of the vehicle along the route comprises:

determining, using the route data, a plurality of route segments that comprise the route;

retrieving, from a database accessible to the on-board computing system, respective attributes for each of the plurality of route segments indicating an autonomous-operation permission while the vehicle is positioned on the corresponding route segment; and determining, based on the respective attributes for each of the plurality of route segments, the one or more anticipated changes in the mode of autonomous operation of the vehicle along the route.

19. The non-transitory computer-readable medium of claim 17, wherein presenting the navigation user interface further includes displaying turn-by-turn directions corresponding to the route within the navigation user interface.

20. The non-transitory computer-readable medium of claim 19, wherein the executed instructions further cause the on-board computing system to present audio alerts corresponding to the turn-by-turn directions and audio alerts corresponding to the autonomy-switching directions.

* * * * *